United States Patent [19]

Selbrede

[11] Patent Number: 5,319,491
[45] Date of Patent: Jun. 7, 1994

[54] OPTICAL DISPLAY

[75] Inventor: Martin G. Selbrede, Thousand Oaks, Calif.

[73] Assignee: Continental Typographics, Inc., Chatsworth, Calif.

[21] Appl. No.: 565,481

[22] Filed: Aug. 10, 1990

[51] Int. Cl.⁵ .................. G02B 26/00; G09G 3/02
[52] U.S. Cl. .................... 359/291; 345/206
[58] Field of Search ............... 359/34, 291, 454, 292; 385/30, 32, 901, 13; 340/702, 718, 719, 783, 701

[56] References Cited

U.S. PATENT DOCUMENTS

| | | |
|---|---|---|
| 3,655,261 | 4/1972 | Chang . |
| 3,907,407 | 9/1975 | Vilkomerson . |
| 4,030,090 | 6/1977 | Endriz . |
| 4,088,991 | 5/1978 | Sachar .................. 359/292 |
| 4,091,375 | 5/1978 | Robillard . |
| 4,218,636 | 8/1980 | Miyazawa . |
| 4,234,245 | 11/1980 | Toda . |
| 4,343,536 | 8/1982 | Watanabe .................. 359/291 |
| 4,786,149 | 11/1988 | Hoenig . |
| 4,794,370 | 12/1988 | Simpson . |
| 4,807,967 | 2/1989 | Veenvliet . |
| 5,045,847 | 9/1991 | Tarui et al. .................. 340/719 |

FOREIGN PATENT DOCUMENTS 0219069  4/1987  European Pat. Off. .
0278038  8/1988  European Pat. Off. .

Primary Examiner—Loha Ben
Assistant Examiner—Evelyn A. Lester
Attorney, Agent, or Firm—James H. Griffith

[57] ABSTRACT

An optical display in which at least one pixel is selectively controlled to shutter light out of a light guidance substrate by violating the light guidance conditions of the medium, and in which a full color palette is provided by multiplexing the three additive primaries in relation to the inherent limitations of the human eye.

46 Claims, 4 Drawing Sheets

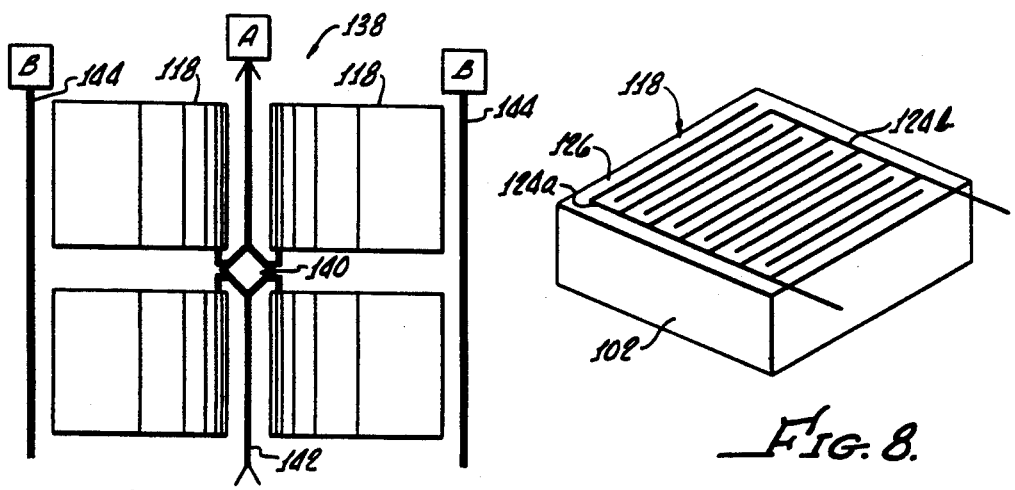
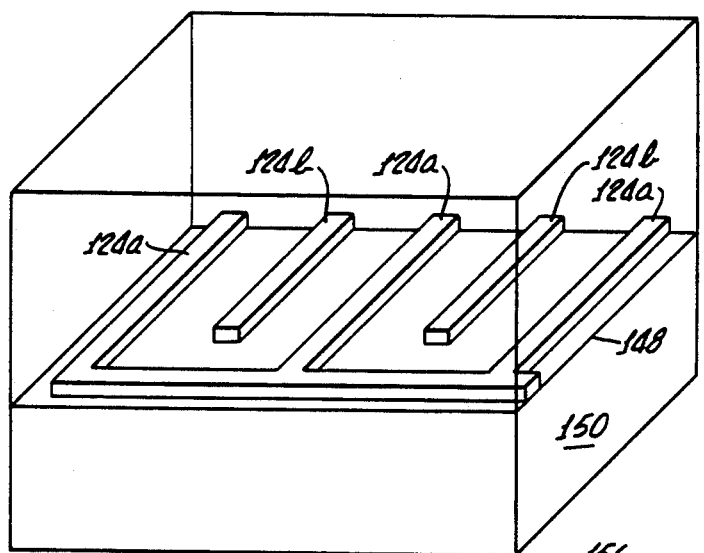
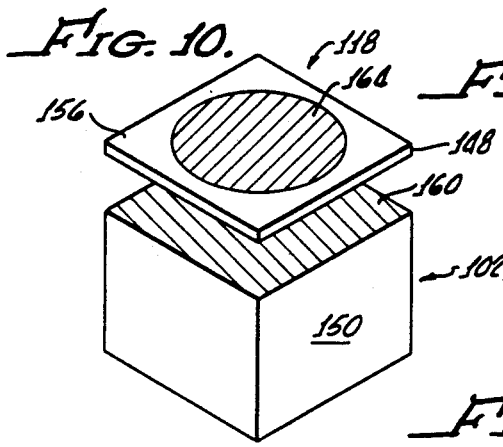
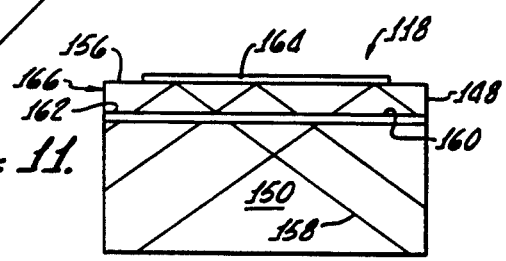
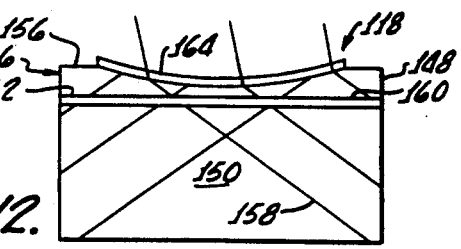

OPTICAL DISPLAY

BACKGROUND OF THE INVENTION

1. Field of the Invention

The invention relates primarily to the field of color, flat-panel display devices.

2. Description of Related Art

The prior art contains various approaches to the problem of providing color, flat-panel displays. A common approach is to form a pixel of a plurality of color cells. One such approach, using liquid crystal, utilizes three color cells—one red, one green, and one blue—to form an RGB (red-green-blue) pixel. This is sometimes modified to include a fourth cell for control purposes. Another similar approach includes a color plasma pixel comprised of nine color cells. The bottom three cells are blanks inserted to prevent smearing of the image due to locally intense electrical effects native to the plasma approach.

The underlying principle of such conventional color pixels relies on the physiological fact that the color cells making up the respective pixels are too small to be individually resolved am a spatial matrix of separate colors. This optical limitation of human vision means that the eye integrates each of the separate colors from a pixel and perceives them as a mixture. Thus such prior art pixels exploit the eye's tendency to integrate details on a sufficiently small spatial scale. However, human vision is limited not only with respect to spatial resolution, but also with respect to temporal resolution. The limited temporal resolution of human vision (which gives rise to the effect known as persistence of vision) allows humans to see motion pictures as continuous moving images rather than as the consecutive still images they actually are. This temporal-integrative attribute of human vision is utilized in the present invention. It is thus an object of the present invention to provide an improved pixel which, in conjunction with other aspects of the present invention, is yet able to provide color as well as black-and-white display.

Generally the prior art approaches utilize one of the following types of pixels: color liquid crystal; color gas plasma; color electroluminescent; and electrochromic. Each of these approaches exhibits serious disadvantages. For instance, liquid crystal display screens often exhibit the following disadvantages: directionality limits off-axis viewing; demands considerable backlighting power; sustains optical losses due to color filtering intrinsic to the approach; flexible backlights hove short product lives (less than 5000 hours); environmentally limited by the liquid crystal freeze point. Color plasma screens often exhibit these disadvantages: uses secondary emission process (excitation of neon causes color phosphor to radiate); containment of noble gas presents packaging constraints (rigid glass screens are required); unlike black-and-white plasma, color pixel life is short; extremely high manufacturing costs; very high power drain, especially when energized to sunlight-readable viewing levels. Finally, electroluminescent and other approaches often exhibit these disadvantages: key colors are presently elusive in electroluminescent technology, and display life is unacceptably short; certain electroluminescent embodiments are power-hungry; electrochromic and similar organic approaches have been discredited in the information display community.

Particularly when considering military or environmentally difficult applications, the foregoing prior art approaches quickly manifest their deficiencies. They are lacking chiefly the following characteristics which are necessary for these applications: no susceptibility to thermal environmental factors (this rules out liquid crystals); long display life (this rules out phosphors and electroluminescence); lower power consumption (a likely consequence of a low optical loss design); attains theoretical limits for pixel color generation and electronic control; intrinsically easy to ruggedize.

Thus, among the objects of the present invention, are the following: avoid filtration to prevent optical losses; avoid secondary emissive effects to prevent additional loss of efficiency; avoid existing light-generative means employed by prior art flat panel technologies; and to provide an improved pixel.

Among specific prior art display devices are the following. Simpson et al. U.S. Pat. No. 4,794,370 discloses a display device wherein electrostatic force is used to position a flexible member in relation to a stator member in order to achieve an array of binary elements suitable for alphanumeric or graphic displays. Veenvliet et al. U.S. Pat. No. 4,807,967 discloses a device wherein a movable electrode is propelled between two stationary electrodes by (at least in part) electrostatic force and (in at least one embodiment) a mechanical spring force. An opaque, non-conductive liquid disposed between the stationary electrodes provides the optical characters depending on the position of the movable electrode. Todd et al. U.S. Pat. No. 4,234,245 discloses an arrangement wherein a bimorph element comprised of ceramic piezoelectric material is electrostatically bent between first and second positions in order to shutter light. Generally the prior art devices, as the foregoing, to the extent they may be relevant to the instant area of invention, are undesirably slow and lacking in optical resolution.

BRIEF SUMMARY OF THE INVENTION

The present invention comprises an improved optical display premised on fundamental principles of light guidance in high-refractive-index substrates, whereby the guidance condition is locally violated, shuttering light out of the plane of the substrate. This is accomplished through use of locally powerful electrical fields exerting force on a deformable light guidance substrate, or, alternatively, exerting force on a deformable interstitial cladding composed of a suitable optical-grade elastomer. To avoid excessive heating, an electrostatic approach is preferred to a current-based approach; however, it should be understood that the present invention may be practiced by way of approaches other than electrostatic. Additionally, the present invention comprises apparatus for multiplexing alternating flashes of the primary additive colors in order to provide color as well as monochrome and infrared optical output.

According to the present invention, light can be coupled out of the substrate in four different, though related, ways. In a first preferred embodiment, an electret layer is imbedded in the guidance substrate. This electret provides a constant electric field. A pixel comprises a plurality of cells, each cell of which further comprises an interdigitated pair of electrodes. When opposite charges are applied to the pair of electrodes in a given pixel cell, coulomb forces of attraction and repulsion cause a mechanical deformation of the surface of the guidance substrate. This deformation is sufficient to locally violate Total Internal Reflection (TIR), defeating light guidance. With internal light no longer satisfying the critical angle for the substrate material, light is coupled out according to the laws of ray optics. A second preferred embodiment exploits wave diffraction coupling effects, whereby surface geometries are dynamically reconfigured using electrostatic forces to induce ripples on the surface, with the interstitial spacing tuned for optimal coupling of visible light. A third embodiment exploits a direct coupling effect, similar to the first embodiment, whereby TIR is locally violated at the pixel by directly modifying the surface geometry of the substrate. In this embodiment, a capacitive effect is used to provide a force of attraction sufficient to defeat light guidance conditions. A fourth embodiment exploits an evanescent coupling effect, whereby TIR is violated at the pixel by modifying the geometry of the substrate's elastomeric cladding, the resulting concavity bringing an affixed high-refractive index disk within the limit of the substrate's evanescent field (generally extending outward from the substrate up to one wavelength in distance). The electromagnetic wave nature of light causes the light to jump the intervening low-refractive-index cladding across to the coupling disk attached to the electrostatically-actuated dynamic concavity, thus defeating the guidance condition and TIR.

The optical shutter as described above will, of course, couple out only the light native to the guidance substrate. The ability of the present invention to generate a large palette of colors is based on the human eye's attribute known as persistence of vision. Just as motion pictures are not seen as consecutive static images, so too rapidly strobed colors are perceived in mixture by the retina/brain complex given a high enough frequency. Thus, rather than driving the substrate with continuous white light, the present invention calls for a rapid, continual alternation of red, green and blue lights being flashed into the light guidance substrate. As these are the additive primaries, all colors can be created using various mixtures of these colors. The fundamental frequency for a full cycle of such alternations (red-green-blue) is 1/60 second. Thus every second, red, green and blue are flashed into the guidance substrate 60 times each, meaning 180 flashes total of all colors combined (i.e., each flash of color lasts but 1/180 second).

The optical shutter is capable of being opened and closed quite rapidly. One embodiment utilizes a fundamental optical shutter frequency of 180 Hz, while another embodiment utilizes a fundamental optical shutter frequency of 2,880 Hz. In the former embodiment, which comprises a multi-cell pixel having differentially-sized cells, the intensity of a given one of the three additive primaries is varied by controlling the fraction of the pixel's total surface area which is actually shuttered open during a given color cycle. Assuming an eight-cell pixel, this embodiment is capable of providing a palette of over 10 million colors. In the latter embodiment, which comprises a single-cell pixel, the intensity of a given one of the three primaries is varied by controlling the time during which the shutter remains open during a given color cycle. This embodiment is capable of providing a palette of 4,913 colors. However, by using a shutter frequency greater than 2,880 Hz, even larger palettes of color can be created.

The optical properties of the substrate hold true for infrared light as well, so that a color display can be instantaneously converted to an infrared display by shutting down the red-green-blue cycle and coupling a continuous infrared source to the guidance substrate. In a preferred embodiment, this results in a display with a 48-level gray scale in infrared (as well as in monochrome of the visible spectrum, achieved by continuous application of one color rather than alternating application of the RGB source lights). The red, green, blue, and infrared optical sources are deployed on one or more edges of the guidance substrate.

The shuttering of the additive primaries in proper proportion, i.e., time multiplexing, relies on the fact that the human eye integrates the resultant photon signatures and interprets them as actual colors. Conventional color displays separate the pixel colors spatially, with the eye integrating the color mixture due to its inability to resolve separate color sources that combine to form a tripartite pixel smaller than the Yehudi Limit. The present invention separates the colors temporally, with the eye integrating the color mixture due to its inability to resolve separate colors as distinct consecutive images due both to the rapidity with which the information enters the eye, and the eye's intrinsic persistence of vision. In summary, Conventional approaches exploit the eye's spatial resolution limit, and the present invention exploits the eye's temporal resolution limit.

A typical screen of the present invention would contain an imbedded matrix of over a million such pixels, at a pixel density equal to or exceeding 300 pixels per inch, according to the resolution requirements of a given application. The screen, which can be flexible as well as rigid, would behave as a large dynamic RAM chip, and would be driven directly by a CPU's video RAM in one-to-one correlation under an extremely rapid refresh regimen. Converters could be utilized with the present invention to permit compatibility with conventional television or with high definition television (HDTV). It should be noted, however, that the present invention provides twice the resolution as current HDTV configurations.

BRIEF DESCRIPTION OF THE DRAWINGS

FIG. 7 is a schematic diagram of the control circuit topology for the optical display as shown in FIG. 1;

FIG. 8 is an idealized perspective view of a second preferred embodiment of a pixel in the quiescent state;

FIG. 9 is an idealized perspective view of a modification of the pixel as shown in FIG. 8;

FIG. 10 is an idealized, exploded perspective view of a third preferred embodiment of a pixel in the quiescent state;

FIG. 11 is a side view of the pixel as shown in FIG. 10;

FIG. 12 is a side view of the pixel as shown in FIG. 10 while in the activated state;

DETAILED DESCRIPTION OF THE PREFERRED EMBODIMENT

Figure 1:
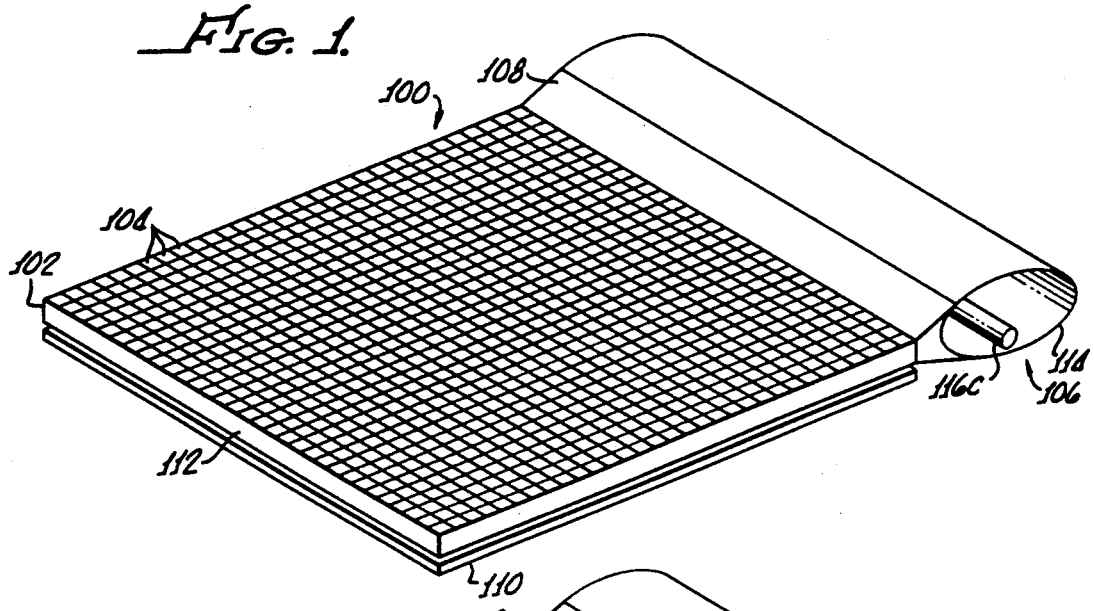
FIG. 1 is an idealized perspective view of an optical display of the present invention.

With reference to FIG. 1, there is shown in idealized form an optical display 100 of the present invention. In the preferred embodiment, the optical display 100 comprises a light guidance substrate 102 which further comprises a flat-panel, n×m matrix of optical shutters (also known as pixels, i.e., picture elements) 104 and a light source 106 which is capable of selectively providing white, red, green, blue, monochrome, and infrared light to the matrix 104. The light source 106 is connected to the matrix 104 by means of an opaque throat 108. Behind the light guidance substrate 102 and in parallel, spaced-apart relationship with it is an opaque backing layer 110. The edges of the light guidance substrate 102 are silvered, as indicated, for example, at 112.

The light source 106 comprises an elliptical reflector 114 which extends the length of the side of the light guidance substrate 102 on which it is placed. Within the reflector 114 are three tubular lamps 116a, 116b, and 116c (not entirely shown in FIG. 1) disposed in a serial, coaxial manner. The lamps 116a, 116b and 116c provide, respectively, red, green, and blue light. The longitudinal axis of the lamps 116a, 116b and 116c is offset from the major axis of the reflector 114 in order to reduce optical losses due to the presence of on-axis light rays that fail to reflect off the top surface of the light guidance substrate. In other words, the lamps are situated to minimize the presence of light which is unusable for shuttering/display purposes.

The light source 106 further comprises the opaque throat aperture 108 which is rigidly disposed on one edge of the light guidance substrate 102. The aperture 108 in turn rigidly supports the reflector 114 and its associated lamps 116a, 116b and 116c. The aperture 108 is proportioned to admit and allow throughput of light from the light source 106 which enters at angles such that the sine of any given angle is less than the quotient of the throat height divided by the throat depth.

Figure 2:
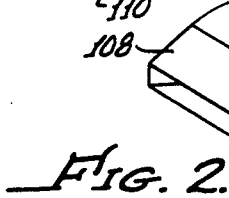
FIG. 2 is a perspective view of an alternative light source for the display as shown in FIG. 1.

In FIG. 2 there is shown an alternative light source which comprises an opaque throat aperture 108 as discussed above which is rigidly connected to an elliptical reflector 114 also as discussed above. However, within the reflector 114 are disposed a red lamp 116a, a green lamp 116b, and a blue lamp 116c in a vertical stack within the reflector 114.

Should infrared light be desired, the colored lamps may either be replaced with an infrared lamp, or an infrared lamp may be disposed next to the colored lamps within the reflector 114, or an infrared lamp may be disposed within its own reflector (not shown) on another edge of the light guidance substrate 102.

FIRST EMBODIMENT

Various details of a first preferred embodiment are shown in FIGS. 1 through 7. More particularly, a pixel 118 of a first preferred embodiment of the present optical display comprises a light guidance substrate 102, an embedded electret layer 120, a plurality 122 of pixel subdivisions, and a plurality 124 of electrodes.

The light guidance substrate 102 may be formed of various well-known optical materials which are transparent, dielectric, and of high refractive index; in the preferred embodiment it is formed of Lucite (phenylmetbyl methylacrylate) with a flat top surface 126 and a parallel, flat bottom surface 128. The light guidance substrate 102 is fashioned in a known manner in order to guide, or channel, light rays 130 from a light source 106. It has been found that materials having a refractive index of at least 1.54 should be used to fashion the light guidance substrate 102. The Lucite used to form the light guidance substrate 102 must also be very clear (low in contaminants and lattice defects) in order to avoid differences in brightness within the guidance material.

The electret layer 120 may be formed by ion injection or, preferably, by electron bombardment in order to provide a thin lateral monocharged electret plane (on the order of ten microns thick) within the light guidance-substrate 102, and approximately 10 microns below the top surface 126 of the light guidance substrate 102. The electret layer 120 provides a uniform electric field over the top surface 126 of the light guidance substrate 102, via deep-trapping of space-charges in the dielectric.

Due to the extremely high electric fields in this device the use of sharp corners, particularly convex corners, should be avoided. Sharp corners facilitate dielectric breakdown and the catastrophic failure of the cell.

Disposed on the top surface 126 of the pixel 116 and integral therewith are the pixel cells or subdivisions 122. Although it is not necessary to the present invention that there be precisely eight pixel subdivisions, as shown, for instance, in FIGS. 3 and 6, it has been found helpful because of the standard eight-bit word length in many computer systems. The relevance of this aspect of the invention will be made plain in a later section of the disclosure. The pixel subdivisions comprise parallel slivers. Each of the pixel subdivisions 122 is twice as wide as its nearest neighbor on one side, and half as wide as its nearest neighbor on the opposite side (except for the two edge pixel subdivisions which, of course, each hove but one neighbor). In the first preferred embodiment as shown, the pixel subdivisions 122 have the relative areal ratios (as viewed in FIGS. 3 and 6 from right to left) of 1:2:4:8:16:32:64:128, or, stated with greater mathematical generality, $$2^0:2^1:2^2:2^4:2^5:2^6:2^7 =$$
$$2^{(n-8)}:2^{(n-7)}:2^{(n-6)}:2^{(n-5)}:2^{(n-4)}:2^{(n-3)}:2^{(n-2)}:2^{(n-1)},$$

where n, which represents the number of pixel subdivisions, is equal to 8.

Figure 3:
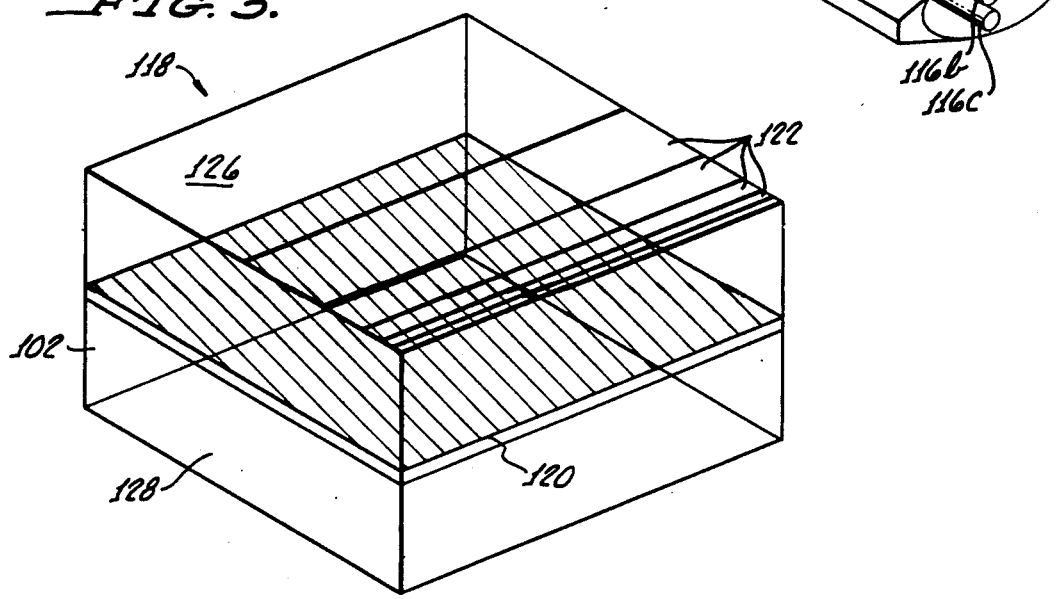
FIG. 3 is an idealized perspective view, not to scale, of a first preferred embodiment of a pixel in the quiescent state.

The subdivisions 122 are defined by the comb-like electrodes 124 which are disposed on the top surface 126 of the light guidance substrate 102, and which, in this first preferred embodiment, are formed of indium-tin oxide. See, for instance, FIG. 4, wherein one of the pixel subdivisions 122 as shown in FIG. 3 is seen from a top view.

Figure 4:
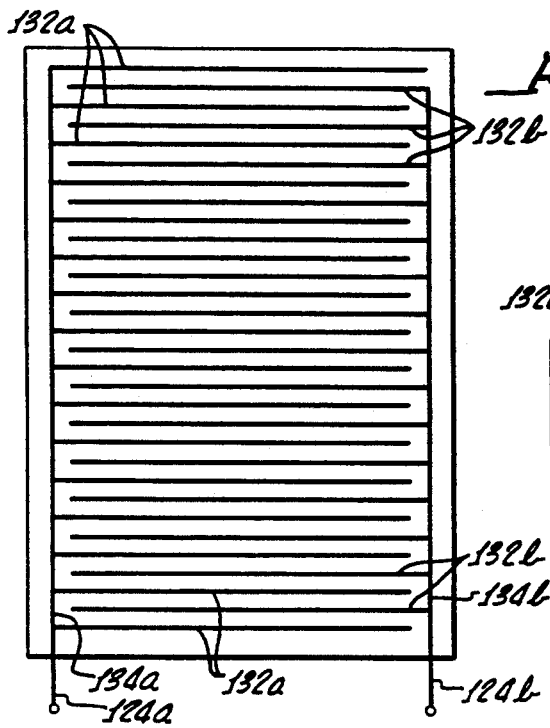
FIG. 4 is a top view of a portion of the idealized pixel as shown in FIG. 3.

With respect to any one of the respective-subdivisions 122, a pair of transparent electrodes 124a and 124b are adhesively attached to the top surface 126 of the light guidance substrate 102, and are arranged in an interdigitated pattern, much as if two combs were carefully pushed together. Thus, each of the opposite-facing comb-shaped electrodes 124a and 124b is provided with a plurality 132a and 132b, respectively, of virtually identical transverse members joined together by respective bus members 134a and 134b which extend the height (as viewed in FIG. 4) of the respective pixel subdivision. Respective electrical leads 136a and 136b are provided for each electrode 124a and 124b. Although but one pair of electrodes is shown in FIG. 4, it is to be understood that each of the subdivisions 122 of the pixel 118 contains a similar interdigitated pair of electrodes, the only difference being that each respective pair is provided with transverse members long enough to occupy the width of the respective differentially proportioned subdivisions, as discussed more fully above.

Figure 5:
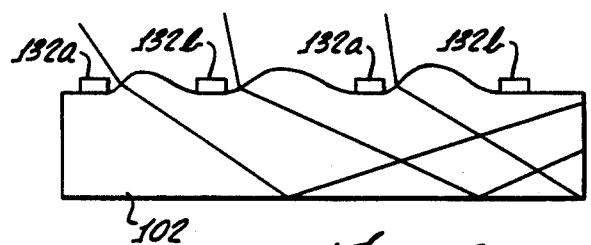
FIG. 5 is a portion of the cross-section indicated by line 5—5 in FIG. 6.

To understand the operation of the pixel 118 of the first preferred embodiment, it should be appreciated that the electret layer 120 inside the light guidance substrate 102 creates a uniform electric field. Since the electret is not a conductor, the electrons embedded therein are locked in place in the so-called "deep traps" of the dielectric's molecular matrix. When the electrodes 124a and 124b are charged, coulomb attraction and repulsion create a mechanical deformation, whereby the substrate matter rises, falls, and flows laterally, depending on where in the matrix any particular point is located. FIGS. 3 and 5, respectively, depict the pixel 118 when quiescent and when activated. The lateral flow during the bulge-constriction distortion helps prevent deterioration of the spring constant in the material, as well as lowering the overall force needed to impose a given curvature coefficient in the surface. The ripples formed by the mechanical deformation are spaced at least ten times farther apart than in the diffraction embodiment (discussed below as the second preferred embodiment) so that no diffraction obtains when the pixel 118 is quiescent. The ripples, or distortions, are sufficient to violate the guidance condition for the light guidance substrate 102, coupling light out directly by altering the geometry, rather than by the mechanism of optical diffraction.

Figure 6:
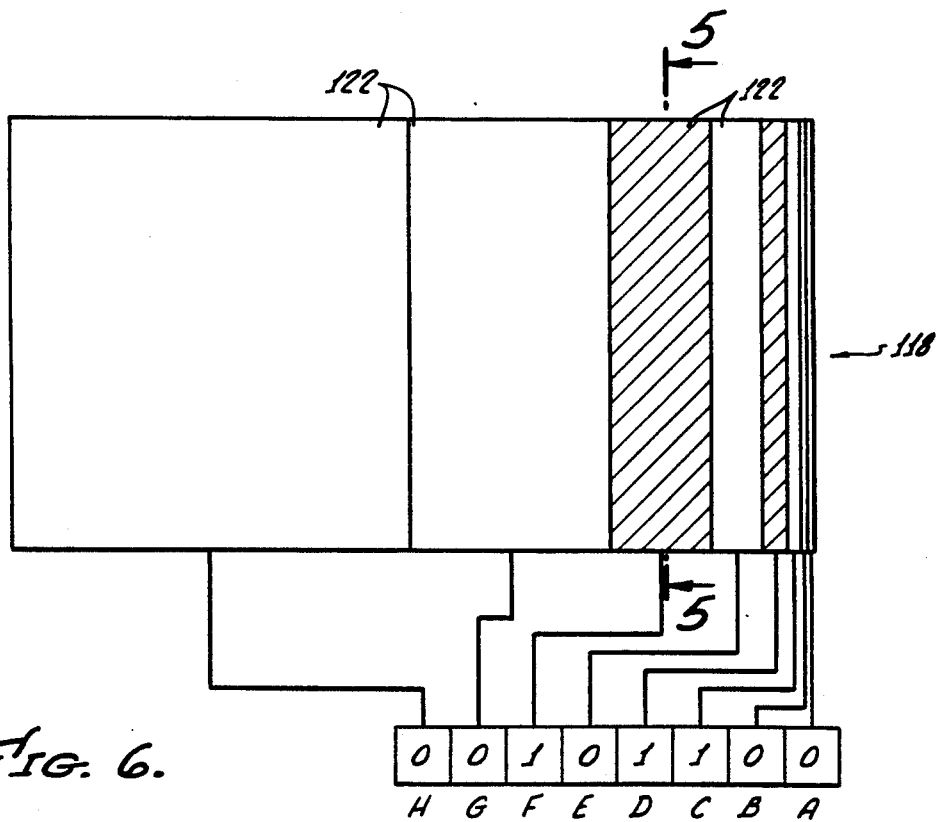
FIG. 6 is an top view of the pixel as shown in FIG. 3 with its associated binary registers.

Turning now primarily to FIGS. 6 and 7, the color-producing apparatus of the first preferred embodiment of the present invention will be described. As discussed in the foregoing, the pixel 118 is configured as eight adjacent comb structures, each disposed upon a rectangular sliver of respective dimensional proportions 1/255, 2/255, 4/255, 8/255, 16/255, 32/255, 64/255, and 128/255. Each of these pairs of interdigitated conductors has its own control circuit for energization.

A suitable control circuit 138 is represented schematically in FIG. 7. There we see four of the pixels 118 electrically connected to a common decoder 140. The decoder 140 is electrically connected to data bus 142. Each of the four pixels 118 is electrically connected, as stated above, to the decoder 140, and also to one or the other of the two ground buses 144, in a Y—Y driver scheme. It should be noted, however, that buses 144 may also be negative, depending upon the precise type of arrangement chosen, neither of which is exclusively mandated by the present invention. FIG. 6 shows a respective one of the four pixels 118 of FIG. 7. Also shown in FIG. 6 is an eight-bit, binary register 146 of the decoder 140 which relates to the respective pixel 118. As can be seen, the eight-bit register 146 is electrically connected so that each binary register of the eight-bit register 146 is gated to respective subdivisions 122 of the pixel 118. Thus, the decoder 140 is designed in a well-known manner to receive a 32-bit word and to translate that word into four eight-bit words, and to feed each of its respective binary registers to the respective gates on respective subdivisions of the pixels 118, which either charges or discharges the respective pixel subdivision depending on whether that register for that color primary presently traveling in the light guidance substrate contains a "1" or a "0".

The light source 106 (see FIG. 1) is designed to provide white light, or continually alternating red, green, and blue light, or infrared light. In the preferred embodiment as described above, the fundamental clock rate for the light source is 1/180 second. In other words, during the strobing of the red, green, and blue, the light source 106 would provide red light for 1/180 second, followed by green light for 1/180 second, followed by blue light for 1/180 second, and so on. Every 1/60 second there would be a complete cycle of all three of the additive primaries.

One of the principal advantages of the differentially proportioned pixel 118 of the first preferred embodiment may be appreciated by observing that the pixel's eight subdivisions 122 correspond to an incoming eight-bit word's binary data string. For example, referring to FIG. 6, if a color mix of red light was intended in the proportion 44/255 of a 1/180 second red cycle, this would correspond to an incoming eight-bit binary word 00101100. Thus, if we label the respective rectangular structures (assuming, as shown, identical heights on each rectangular double-comb structure) in width proportions of 1:2:4:8:16:32:64:128 as gates A, B, C, D, E, F, G and H, respectively, the -incoming binary eight-bit word for decimal 44 would open gates C, D and F while leaving A, B, E, G, and H closed. Thus, gates for C, D and F will remain open for the entire 1/180 second red cycle, utilizing areal mixing of light proportions, versus the paradigm invoked in the third preferred embodiment as discussed below, wherein the entire pixel would need to be turned on for 44/255 of the 1/180 second cycle, utilizing temporal mixing of light proportions. In the approach taken in this preferred embodiment, the eight-bit binary data is refreshed 180 times a second, with each new word representing the appropriate proportion attribute for each successive substrate-bound additive primary. In addition, and at the expense of complicating the otherwise more simple single-gate shutter control discussed below in reference to the third preferred embodiment, the embodiment described above has been found to provide a 30-fold or greater improvement in addressing speed, and five-fold improvement in pixel life expectancy. Thus the first preferred embodiment appears to have greater utility and ease of manufacture than the third preferred embodiment. In other words, time-multiplexing is used with reference to the differentially proportioned pixel insofar as the alternating sequence of red-green-blue in the substrate is concerned, but the principle is yielded in regard to individual proportioning of the intensity of the additive primaries by supplanting time-multiplexed color mixing with a straightforward areal mixture that is not subject to such highly-demanding temporal control of the pixels' off-on cycling. The fundamental frequency for the system thus is simply 180 Hz, rather than 2,880 Hz. Consequently, there is no need to convert incoming color information into pixel duration times during real time. Moreover, the geometry of the eight adjacent rectangular slivers that compose the 255×255 square pixel (0.01" on a side in the target application screen) correlates in one-to-one fashion with the proposed eight-bit word used to describe each attribute for the additive primaries.

The advantage of an eight-bit word over the four-bit word conceived for the base frequency of the third embodiment is that it gives rise to a color palette of over 16 million plus colors compared to only 4,096 colors. This number follows since for any given additive primary (red, green, or blue), the gates allow for 256 different states (zero, corresponding to no active zones, through 255, corresponding to an entirely lit square pixel when all eight regions are gated on). Thus, with 256 levels of red, 256 levels of green, and 256 levels of blue, the total color palette is 256 to the third power which is on the order of 16,000,000. This should be compared with the human eye's color resolution limit of but 10,000 colors, although the latter figure is irrespective of any inherent brightness variable. Brightness as a controllable variable forms a mathematically orthogonal filter set that computationally absorbs one or more bits of the binary register arbitrarily set aside to govern the attribute. To attain 16 different brightness levels per pixel as an addressable attribute requires four bits of binary data ($2^4=16$), leaving only four bits to describe the color proper ($2^4 \cdot 2^4 \cdot 2^4 = 2^{12} = 4,096$ colors). The orthogonality of the solution sets demonstrates the greater utility of addressing $2^{24}$ colors rather than $2^{12}$ colors at $2^4$ brightness levels (note that brightness must integrate over all three primary colors to be valid).

Figure 15:
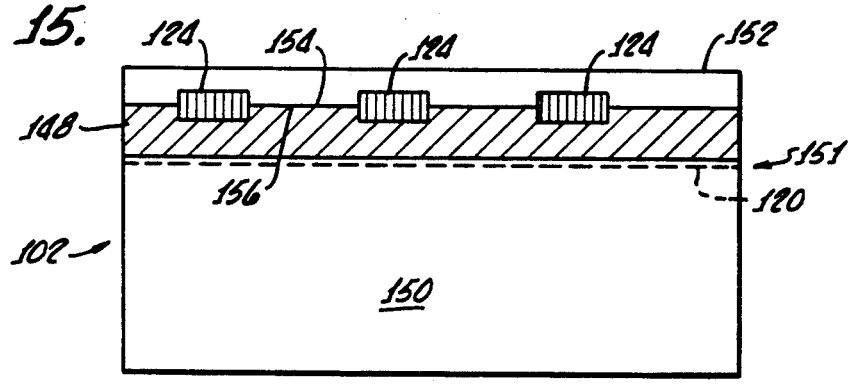
FIG. 15 is an idealized elevation view of a modification of the first preferred embodiment of the pixel as shown in FIG. 3.

A modification of this first preferred embodiment is depicted in FIG. 15 (where like reference numerals indicate like features). The light guidance substrate 102 additionally comprises a ten micron thick, deformable elastomer layer 148 which is of optical grade. The plane of the deformable elastomer layer 148 is parallel to that of the underlying (Lucite) portion 150 of the light guidance substrate 102. An electret layer 120 is provided on the top surface 151 of the light guidance substrate 102, i.e., between the Lucite 150 and the deformable elastomer layer 148, in this instance imposed most expeditiously via gross polarization of the Lucite (thermoelectret charging per Heaviside, et al.) to produce a net surface charge as required, foregoing the electron-injection method which is a sub-optimal approach for this particular embodiment. A transparent cover plate 152 retains the electrode structures 124, the bottom surface 154 of which rests on the top surface 156 of the deformable elastomer 148. The electrical force signature is identical to the first preferred embodiment its described above, but the actual distorting region (morphodynamic zone) is now the electret layer at the substrate-elastomer boundary, rather than the adhesively attached electrodes on the some boundary plane. This embodiment precludes deleterious effects arising from electrode deposition (latent enthalpy and Gibbs Free Energy surface distortions that corrupt the quiescent flatness of the substrate surface) and adhesion challenges at the electrode-substrate boundary, wherein molecular fugacity may cause a gradient in the refractive index, violating the sharply-defined discontinuity in refractive indices required at the material boundary.

It should be understood that, while the foregoing approach to color multiplexing has utilized a hybrid areal-time multiplexing, this is not required by the present invention. As will be seen below in the discussion of the third preferred embodiment, it is also possible to utilize d pure, i.e., non-hybrid, time multiplexing that does not involve areal proportioning of the respective pixels.

SECOND EMBODIMENT

With reference primarily to FIGS. 8 and 9, there is shown a pixel 118 of a second preferred embodiment of the present invention. As with the foregoing discussion of the first embodiment, and solely for purposes of clarity in explanation, directions such as up and down shall be sometimes used but they are to be understood as relative merely to the drawings for ease of description. They in no way are intended to limit the applicability or use of the present invention.

Turning first to FIG. 8, it can be seen that the pixel 118 is supported by a light guidance substrate 102. The substrate may be formed of various well-known optical materials of high refractive index; in this preferred embodiment it is formed of Lucite. The light guidance substrate 102 is fashioned in a manner well known in order to guide, or channel, light from a source (as described more fully in the foregoing). It has been found that materials having a refractive index of at least 1.54 should be used to fashion the light guidance substrate 102. For further details, reference should be made to the foregoing discussion.

Disposed on the upper surface 126 of the light guidance substrate 102 and bonded thereto is a pattern of clear, indium-tin oxide conductive electrodes 124. In the preferred embodiment a pair of electrodes 124a and 124b are disposed in an interdigitated, comb-like arrangement as described in the foregoing section of this disclosure, although it should be understood that the invention also contemplates that the electrodes may be arranged in other patterns, such as a circular fashion, or elliptical, or square. In the preferred embodiment, however, the electrodes are spaced at 1 micron and are 0.3 microns across.

A slightly modified structure is shown in FIG. 9, wherein the light guidance substrate additionally comprises deformable elastomer layer 148 (which is formed of RTV or other deformable, protective cladding) disposed between the comb-like electrodes 124a and 124b, and the Lucite of the light guidance substrate 102, to prevent unwanted distortions in the surface of the light guidance substrate 102. The slight translation of the E-field has virtually no impact on the intensity of the desired effect.

The deformable elastomer layer 148 is a high-dielectric, clear elastomer, which in the preferred embodiment is comprised of RTV (room temperature vulcanizing silicone rubber) with a dielectric strength of approximately 550 volts/mil and a refractive index of 1.45. It has been found that this layer must be greater than 10 microns thick. Although not necessary to the present invention, it bas been found wise in practice to provide such a layer as described in this paragraph as a protective cover.

The backing layer 110 (shown in FIG. 1) behind the light guidance substrate 102 must be spatially separated to prevent absorption. It can be black, or of variable opacity (LCD variable shade window), or clear (cockpit windshield, etc.).

In operation of the pixel 118, control circuitry of any well known type may be used selectively to apply opposite charges to the electrodes 124a and 124b. In the quiescent state, the pixel 118 remains flat with reference to the plane of upper surface 126 of the light guidance substrate 102. In such a state, the light guidance conditions are met, and the light remains channeled within the light guidance substrate 102. However, should opposite charges be applied to electrodes 124a and 124b, an electrostatic force will be developed perpendicular to the material interface between the light guidance substrate 102 and the deformable elastomer layer 148 which will cause a rippling in the surface of the substrate. The ripples arise as a result of the Becker effect. According to the Becker effect, the charging of the electrodes 124a and 124b causes an electric field (E-field) which in turn creates a normal force (90 degrees offset from the direction of the Enfield) in the direction of the gradient in the dielectric constant at the boundary between the light guidance substrate 102 and the deformable elastomer layer 148. As this force is computationally an absolute value, the distortion is always in the same direction irrespective of the charge, i.e., it always faces out of the plane of the RTV-Lucite boundary. This distortion, while truly microscopic, is spaced intervallically to compel a prominent diffraction effect, thus coupling light out of the light guidance substrate in accordance with the wavelength and electrode interspacing ratios. In order to invoke the necessary diffraction effect the spacing between the ridges, i.e., the adjacent oppositely charged electrode members, must range between 5,000 Angstroms and 9,000 Angstroms. However, the amplitude of the distortion need not exceed a vertical-to-lateral ratio of approximately 1:100.

Since the local geometries comply with the Euclidean relationship between the arc and chord of a highly acute proscribing angle, the voltages and currents required to dynamically impose a diffracting coupler matrix onto the elastomer's surface is very low (far below the breakdown voltage (i.e., the dielectric strength) of the elastomer, and well within the voltage range of TTL semiconductor devices in the existing art). The resultant diffraction grating is tuned according to the known laws of wave optics to optimize light coupling out of the light guidance substrate 102.

In operation of the pixel 118, it will be found that the upper surface 126 of the light guidance substrate 102 will return to its flat, quiescent state upon removal of the opposite charges upon the electrodes 124a and 124b under the impetus of the material's inherent spring constant. In this quiescent state the light coupled out due to residual diffraction is nonexistent at the specific wavelength which was previously being coupled out, however, there may be coupling of light of different wavelengths even in the quiescent state if the interstitial layer of RTV between electrodes and Lucite is thinner than one wavelength—maintaining careful control over this variable during manufacture is thus critical.

Color multiplexing of the pixel 118 of the second embodiment may be accomplished as described below with reference to the third embodiment.

THIRD EMBODIMENT

With reference to FIGS. 10 through 14, there is shown a pixel 118 of a third embodiment of the present invention. For purposes of explanation in what follows, directions such as up and down shall be used. But they are to be understood as relative merely to the drawings for ease of description. They in no way are intended to limit the applicability or use of the present invention.

The pixel 118 comprises a light guidance substrate 102. The light guidance substrate 102 may be formed of various well known light-guiding materials of high refractive index as described above. In the preferred embodiment it is formed of Lucite. The light guidance substrate 102 is fashioned in a manner well known in fiber optics in order to guide, or channel, light represented by arrow from a light source 106.

Disposed on the upper surface 151 of the Lucite underlying portion 150 of the light guidance substrate 102 and bonded thereto is a ground plane 160 which in the preferred embodiment is comprised of indium-tin oxide.

Disposed on the upper surface 162 of the ground plane 160 by deposition is a deformable elastomer layer 148 which in the preferred embodiment is comprised of RTV (room temperature vulcanizing silicone) with dielectric strength approximately 550 volts/mil and compression modulus 261 PSI. It has been found that the deformable elastomer layer 148 should be of a thickness of approximately 10 microns. It should be noted that the guided light travels within both the light guidance substrate 102 and the deformable elastomer layer 148. This effect is achieved by careful matching of the respective indices of refraction of the light guidance substrate and the elastomer deposited thereon. Thus, in fact, both layers together constitute the actual guidance substrate.

Disposed on the upper surface 156 of the deformable elastomer layer 148 is a transparent conductive plate, or electrode 164, between 0.003" and 0.01" in diameter. The electrode 164 is comprised of transparent indium-tin oxide. In effect, the electrode 164 and the ground plane 160 form a parallel plate capacitor. The capacitor 166 thus formed is controlled by electrostatic charging and discharging in a known manner by way of control wires (not shown) which intersect on the electrode 164. In the preferred embodiment, the control wires are on the order of 100 microns or less in diameter, and are driven by a DRAM control circuit.

The distance between the electrode 164 and the ground plane 160 is very small (about 10 microns) and occupied by the deformable layer, a thin deposition of RTV (room temperature vulcanizing silicone) or similar optically appropriate material. While the voltage is small, the field across 10 microns is enormous, and imposes a powerful deforming force on the RTV, coupling light out of the main substrate 102 beneath the ground plane 160. The equations describing this force are those governing the force between the two members of a parallel plate capacitor, said force being proportional to the capacitance and the square of the voltage, among other critical relationships in this dynamic application. Calculation of the physical response time of the pixel 118 under activation yields cycles on the order of several microseconds to achieve full distortion of the guidance condition. This rapidity of response time (and return-to-quiescence time) makes possible the development of the time-multiplexed color system described herein. A pure electrostatic principle is thus invoked, utilizing the force between the members of a parallel-plate capacitor to create a stress on a deformable light-guiding layer of RTV. The stress initiates a corresponding strain on the RTV, compressing it the appropriate fraction of its quiescent depth so as to alter the geometry. Light that is guided, within the underlying substrate 102 and the unstressed deformable elastomer layer 148, upon reaching the deformation, will strike the deformation at an angle of incidence greater than the critical angle for the refractive indices present, and will couple out of the substrate 102 through the electrode 164.

Figure 13:
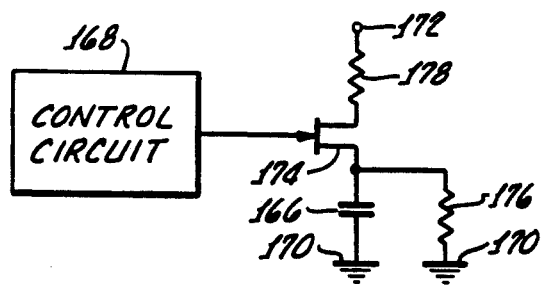
FIG. 13 is a schematic diagram of the control circuit for the pixel of the third preferred embodiment as shown in FIGS. 10-12.

With reference to FIG. 13, where is shown a control circuit 168 for the resultant capacitor 166, the capacitor 166 is disposed between a ground 170 and a voltage source 172 such that a field effect transistor (FET) 174 can selectively bias the capacitor 166 or allow its discharge through a resistor 176 which is also connected to the ground 170. The FET 174 selectively allows bids Of the capacitor 166 in response to a data signal applied to the gate of the FET 174.

In operation of the pixel 118 of FIG. 10, the resultant capacitor 166 is selectively charged and discharged according to the data signal applied to the gate of the FET 174 of the control circuit. The charging of the capacitor 166 in turn causes—through the strength of electrostatic forces between the "plates" of the capacitor—the attraction of the electrode 164 to the ground plane 160. Because the intervening dielectric material, i.e., the deformable elastomer layer 148 is deformable, the electrode 164 is actually pulled toward the ground plane 160 under the influence of capacitative charging. The resultant deformation in the deformable elastomer layer 148 effects the violation of Total Internal Reflection for light guidance, resulting in the coupling of light out of the light guidance substrate 102 into the external environment of the pixel 118.

To describe the operation of the pixel 118 of the present invention with greater particularity, assume initially that the data signal as applied to the gate of the FET 174 is such as will cause the FET 174 to prevent significant source-drain current from flowing between the voltage source 172 and the ground 170. Assume also that initially the capacitor 166 has no charge on it. The capacitor 166 will thus remain in a substantially uncharged condition. In this state, the light guidance substrate 102 will remain non-deformed, and thus light guidance conditions will be met, resulting in no coupling of light out of the light guidance substrate 102 to the external environment of the pixel 118.

However, should an opposite data signal then be applied to the gate of the FET 174, a significant source-drain current will be allowed to flow through the FET 174, thus, because of the presence of the biasing resistor 178, charging the capacitor 166. In this state, the electrostatic attraction between the "plates" of the capacitor 166, i.e., the electrode 164 and the ground plane 160, will cause relative motion of the electrode 164 toward the ground plane 160, naturally resulting in local deformation and hence violation of the guidance conditions for the light guidance substrate 102. As a result, light will be coupled out of the light guidance substrate 102 to the external environment of the pixel 118.

Finally, should the data signal again reverse, the gate of the FET 174 will again cause the shut-off of source-drain current flow through the FET. In turn, the now-charged capacitor 166 will discharge to ground through the biasing resistor 178. The capacitor 166 thus returns to its quiescent state; the electrode 164 is resiliently urged back to its quiescent state whereby the light guidance substrate 102 will no longer be deformed; and the coupling of light out of the light guidance substrate 102 ceases.

As discussed above with reference to the first preferred embodiment of the present invention, it is contemplated that the light source 106 strobe continual, sequential pulses of red, green and blue each for a duration of 1/180 second. It should be recognized, of course, that the light source 106 could as readily provide continuous white light, continuous colored light (i.e., of any given single color), or continuous infrared light, and that all would be within the scope of the present invention. Reference should be taken to the foregoing discussion for the description of this aspect of the present invention.

Figure 14:
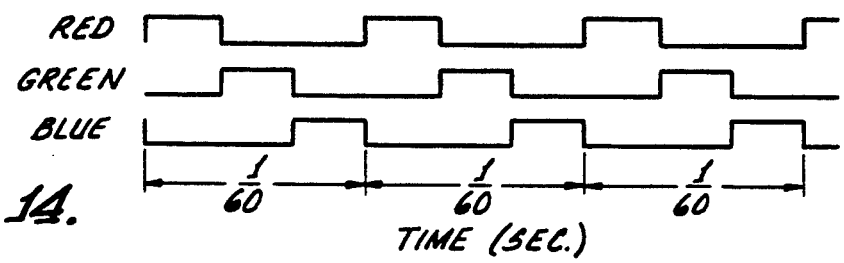
FIG. 14 is a timing diagram depicting the color multiplexing function of the pixel as shown in FIGS. 10-12.

The optical shutter of the third embodiment of the present invention has a cycle rate on the order of microseconds. Thus it is possible, via control (as, for instance, by way of a computer's CRT drive circuitry), to gate the various strobed color bursts independently at each pixel. If reference be taken to FIG. 14, wherein is provided a timing diagram relating, by way of example, a shuttering sequence of the optical shutter of the present invention to the 1/180 second strobed light pulses of red, green and blue, it can be appreciated that within any given 1/60 second color cycle various mixes of the three colors can be provided. Thus, as shown in FIG. 14, the first 1/60 second color cycle provides for a color mix 3/16 red, 8/16 blue, and 12/16 green. The mixtures obtainable depend only on the cycle rates of the optical shutter and the color strobing. In the preferred embodiment of the present invention, wherein a fundamental optical shutter frequency of 2,880 Hz is utilized (which represents 1/16 of any given color's duration), the optical shutter can create a palette of $17^3 = 4,913$ colors perceivable by the human eye. The color-generation function is based on the physiological fact that the human eye/brain complex integrates the separate colors due both to the rapidity with which the information enters the eye and the eye's intrinsic persistence of vision. In other words, the eye integrates the digital color mixture, thus causing the brain to perceive various colors on the spectrum.

FOURTH EMBODIMENT

Figure 16:
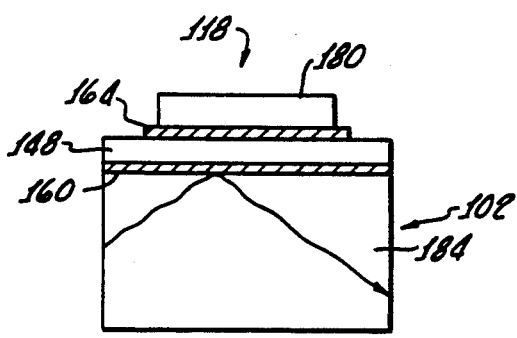
FIG. 16 is an idealized side view of a fourth preferred embodiment of a pixel in the quiescent state.
Figure 17:
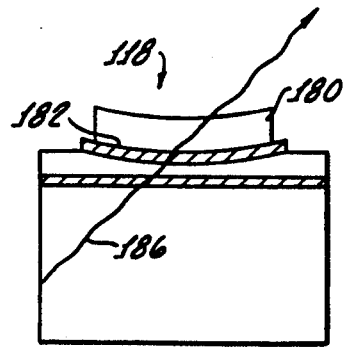
FIG. 17 is an idealized side view of the pixel as shown in FIG. 16 in the active state.

FIGS. 16 and 17 depict a pixel 118 of a fourth embodiment of the present invention. Since the pixel 118 is similar to that of the third embodiment as discussed above, like reference numerals will be used to refer to like features. Thus the pixel 118 of FIGS. 16 and 17 comprises a light guidance substrate 102, a ground plane 160, a deformable elastomer layer 148, and a transparent electrode 164—all formed of the same materials, and disposed in relation one to the other, generally as described above with reference to the third embodiment.

However, the pixel 118 of this fourth embodiment also comprises a transparent element shown for convenience of description as disk 180 (but not limited to a disk shape), disposed on the top surface of the electrode 164, and formed of high-refractive index material, preferably the same material as comprises the light guidance substrate 102.

In this fourth preferred embodiment, it is necessary that the distance between the light guidance substrate 102 and the disk 180 be controlled very accurately. In particular, it has been found that in the quiescent state, the distance between the light guidance substrate 102 and the disk 180 should be approximately 1.5 times the wavelength of the guided light, but in any event this distance must be maintained greater than one wavelength. Thus the relative thicknesses of the ground plane 160, the deformable elastomer layer 148, and the electrode 164 are adjusted accordingly. In the active state, the disk 180 must be pulled (by capacitative action, as described above) to a distance of less than one wavelength from the top surface of the light guidance substrate 102.

In operation, the pixel 118 of the fourth preferred embodiment exploits an evanescent coupling effect, whereby TIR is violated at the pixel 118 by modifying the geometry of the deformable elastomer layer 148 such that, under the capacitative attraction effect, a concavity 182 results (which can be seen in FIG. 17). This resulting concavity 182 brings the disk 180 within the limit of the light guidance substrate's evanescent field (generally extending outward from the light guidance substrate 102 up to one wavelength in distance). The electromagnetic wave nature of light causes the light to "jump" the intervening low-refractive-index cladding, i.e., the deformable elastomer layer 148, across to the coupling disk 180 attached to the electrostatically-actuated dynamic concavity 182, thus defeating the guidance condition and TIR. Light ray 184 (shown in FIG. 16) indicates the quiescent, light guiding state. Light ray 186 (shown in FIG. 17) indicates the active state wherein light is coupled out of the light guidance substrate 102.

It should be appreciated that the pixel 118 of the fourth preferred embodiment makes feasible a family of holographic display screens utilizing the present invention.

Whereas time multiplexing is conceived herein in terms of equal partitioning of the fundamental cycle duration for each primary color, it should be noted that this strategem reflects the exigencies of conventional approaches to clocking such data as it is digitally updated in real time. However, the unequal partitioning of each primary color's time increment permits greater gradation of time-modulated intensity control for a given number of pixel access attempts. For example, subdividing 1/180 second into fifteen equal-sized time increments would be equivalent to subdividing the same increment into only four unequal subdivisions in durative proportions of 1:2:4:8, analogous in principle to the areal proportion scheme previously adduced, excepting that time rather than area is being differentially partitioned to improve the invention's digital performance. The performance gain is theoretically impressive, since unequal partitioning into only eight temporal subdivisions corresponding to the standard binary decomposition adduced above would yield a color palette of 16.7 million colors, whereas equal partitioning of the same pulse into eight segments yields a mere 512 colors. For any n subdivisions of the basic primary color burst, equal partitioning will yield $(n+1)^3$ colors while unequal partitioning will yield $2^{3n}$ colors. The present invention embraces either strategem for subdividing pulse durations during primary color pulse increments.

Furthermore, an additional condition of light guidance can be altered by electrical means, which means are contemplated under the present invention as well. Guidance conditions herein are defeatable by altering surface geometries (thus effecting a change in the angle of incidence of guided light so that the guidance condition is no longer met), by evanescent coupling (whereby electromagnetic induction forces the lightwave across the intervening boundary when a region of similar refractive index is placed closer than one optical wavelength to the guidance substrate via ponderomotive means), by diffraction (via dynamically imposed and optically tuned ripples in the surace of the guidance substrate), and finally by temporarily altering the local value of the refractive index of either the substrate or the encapsulant layer above the substrate such that the differential values of the indices become near enough in value so as to constitute a localized breakdown of the guidance condition for light traveling in the substrate. This last named effect can be induced in a class of electro-optical materials, among them lithium niobate, by application of electrical fields such as are contemplated herein under the other various embodiments. The alteration in refractive index is variously induced; in some materials the effect is direct, in others it is produced by mechanical Compression of the substance, thus giving rise to the requisite change in refractive index. Inasmuch as the present invention applies both powerful local electrical fields at the boundary of a light guidance substrate, and exerts mechanical compression in the vicinity of the pixel, it is evident even in the previously iterated embodiments of the invention that a small portion of the light is being coupled out by this fourth effect, to wit, the change in refractive index electrically and mechanically imposed by the activated pixel structure. Since a careful selection of materials can augment this particular effect to the point where it predominates over the others, the present invention is therefore necessarily inclusive of this fourth category of guidance-defeating means, inasmuch as said coupling effect is inextricably bound up with the other physical principles operative with respect to any device disposed along these lines. Although they are necessarily considered in analytical isolation throughout the within disclosure, in any given embodiment several effects are simultanteously responsible for coupling out the substrate light. The different approaches reflect which effect predominates depending on variation of the basic invention's geometry, mathematical scale, and choice of materials.

What is claimed is:

1. An optical shutter comprising:
   (a) a light guidance substrate adapted to channel light, which light guidance substrate comprises a substantially integral piece of transparent, high-refractive-index dielectric; and
   (b) guidance-defeating means disposed on said light guidance substrate, which guidance-defeating means is adapted selectively and by means of electrostatic attraction to violate the light guidance conditions for said light guidance substrate, thus coupling any channeled light out of said light guidance substrate.

2. The optical shutter of claim 1 in which said guidance-defeating means comprises:
   (a) a translucent electrode disposed on said light guidance substrate;
   (b) a translucent electret plane disposed within said light guidance substrate in parallel, spaced-apart relationship with said electrode, which electret imposes an electric field at said electrode; and
   (c) means for selectively charging and discharging said electrode.

3. The optical shutter of claim 1 in which said light guidance substrate additionally comprises a first layer formed of a high-refractive-index elastomer and a second layer formed of a deformable dielectric, and in which said guidance-defeating means comprises:
   (a) a translucent electrode disposed on said second layer of said light guidance substrate;

(b) a translucent electret plane disposed within said light guidance substrate in parallel, spaced-apart relationship with said electrode, which electret imposes an electric field in the region occupied by said electrode; and (c) means for selectively charging and discharging said electrode.

4. The optical shutter of claim 1 in which said light guidance substrate comprises at least one pixel which further comprises:

(a) a plurality (n) of areal subdivisions having relative areal proportions of $$2^{(n-1)}:2^{(n-2)}:\ldots:2^1:2^0, \text{ where } n<1;$$

(b) a plurality of pairs of interdigitated electrodes disposed such that each of said areal subdivisions contains at least one of said pairs of interdigitated electrodes; and (c) means for selectively activating said pairs of interdigitated electrodes.

5. The optical shutter of claim 4 in which said pairs of electrodes describe a plane when quiescent, and in which said optical shutter further comprises an electret plane spaced apart from and parallel to said plane of said pair of electrodes.

6. The optical shutter of claim 1 in which said guidance-defeating means comprises means for selectively invoking the Becker effect.

7. The optical shutter of claim 1 in which said guidance-defeating means comprises means for impressing a diffraction grating onto the surface of said light guidance substrate.

8. The optical shutter of claim 7 in which said means for impressing a diffraction grating onto said light guidance substrate comprises:

(a) at least one pair of interdigitated electrodes disposed on said light guidance substrate; and (b) means for selectively charging and discharging said pair of interdigitated electrodes.

9. The optical shutter of claim 1 in which said light guidance substrate additionally comprises a first layer formed of a high-refractive-index elastomer and a second layer formed of a deformable dielectric, and in which said guidance-defeating means comprises:

(a) a pair of parallel, translucent electrodes disposed on opposite surfaces of said second layer of said light guidance substrate; and (b) means for selectively charging and discharging at least one of said electrodes.

10. The optical shutter of claim 1 in which said light guidance substrate additionally comprises a first layer formed of a high-refractive-index elastomer and a second layer formed of a deformable dielectric, and in which said guidance-defeating means comprises:

(a) a pair of parallel, translucent electrodes disposed on opposite surfaces of said second layer of said light guidance substrate;

(b) a translucent disk formed of a high-refractive-index elastomer having a refractive index approximately equal to that of said first layer, which disk is disposed on one of said electrodes; and (c) means for selectively charging and discharging said electrodes.

11. An optical display comprising:

(a) a light source capable of outputting alternating pulses of red, green and blue light;

(b) a light guidance substrate, which light guidance substrate comprises a substantially integral piece of transparent, high-refractive-index dielectric, for channeling the output of said light source; and (c) means for selectively shuttering the light out of the light guidance substrate.

12. The optical display of claim 11 in which said means for selectively shuttering the light out of said light guidance substrate includes a pixel which comprises a plurality (n) of areal subdivisions having relative areal proportions of $$2^{(n-1)}:2^{(n-2)}:\ldots:2^1:2^0, \text{ where } n>1.$$

13. The optical display of claim 12 further comprising means responsive to binary-encoded instructions for selectively enabling one or more of said subdivisions.

14. The optical display of claim 13 in which said means responsive to binary-encoded instructions for selectively enabling one or more of said subdivisions comprises:

(a) means for decoding a binary word; and (b) means responsive to said decoding means which means selectively enable or disable one or more of said pixel subdivisions.

15. The optical display of claim 12 in which said plurality of areal subdivisions each comprises:

(a) an interdigitated pair of electrodes which pair of electrodes describes a plane; and (b) an electret plane spaced apart from and parallel to said plane of said pair of electrodes.

16. The optical display of claim 11 in which:

(a) said optical display bas an optical clock rate significantly faster than the temporal color resolution limit of the human eye;

(b) said light source is adapted to output continually alternating bursts of red, green, and blue light wherein each burst is of duration greater than or equal to said clock rate; and (c) said means for selectively shuttering the light out of said light guidance substrate further comprises:

(1) an optical shutter the minimum cycle time of which is equal to said clock rate; and (2) control means adapted to open said optical shutter a varying fractional proportion of the burst time of said light source.

17. The optical display of claim 16 in which said control means further comprises means for selectively opening said optical shutter for a set of n temporal durations, which durations have the binary proportions of $2^0:2^1:2^2:2^3:\ldots:2^{(n-1)}$, so as to yield pulse-modulated intensity control of said respective bursts of red, green and blue light.

18. The optical display of claim 16 in which said optical shutter further comprises a set of n areal subdivisions, which areal subdivisions have the binary proportions of $2^0:2^1:2^2:2^3:\ldots:2^{(n-1)}$, so as to yield pulse-modulated intensity control of said respective bursts of red, green and blue light.

19. The optical display of claim 11 in which said means for selectively shuttering the light out of said light guidance substrate further comprises means disposed on said surface of said light guidance substrate which means is adapted selectively to violate the light guidance conditions of said light guidance substrate.

20. A passive display device comprising:

(a) a light source which includes means for providing strobed bursts of alternating red, blue, and green light, in a continual cycle;

(b) a light guidance substrate adapted to channel light and disposed so as to channel light output by said light source;

(c) guidance-defeating means disposed on said light guidance substrate, which guidance-defeating means selectively deforms said light guidance substrate such that the light guidance conditions for said light guidance substrate are locally violated thus coupling light out of said light guidance substrate; and (d) means for selectively electrically activating said guidance-defeating means whereby said optical shutter is open during controlled periods of time during each of the red, blue, and green portions of the continual strobe cycle.

21. The passive display device of claim 20 in which:

(a) said light guidance substrate comprises a first layer having a first refractive index and a second layer having a second refractive index, which first and second layers are disposed one above the other in parallel relationship; and (b) said guidance-defeating means further comprises means for selectively applying a local electric field to said second layer of said light guidance substrate so as to change the refractive index of said second layer such that it approximates the refractive index of said first layer of said light guidance substrate, whereby light is coupled out of said light guidance substrate.

22. The passive display device of claim 20 in which:

(a) said passive display device additionally comprises an encapsulant layer disposed on said guidance-defeating means and having a second refractive index, which encapsulant layer and light guidance substrate are disposed one above the other in parallel relationship;

(b) said light guidance substrate has a first refractive index; and (c) said guidance-defeating means further comprises means for selectively applying a local electric field to said second layer of said light guidance substrate so as to change the refractive index of said second layer such that it approximates the refractive index of said first layer of said light guidance substrate, whereby light is coupled out of said light guidance substrate.

23. The passive display device of claim 20 in which:

(a) said light guidance substrate comprises a first layer having a first refractive index and a second layer having a second refractive index, which first and second layers are disposed one above the other in parallel relationship; and (b) said guidance-defeating means further comprises means for selectively applying localized compressive force to said second layer of said light guidance substrate so as to change the refractive index of said second layer such that it approximates the refractive index of said first layer of said light guidance substrate, whereby light is coupled out of said light guidance substrate.

24. The passive display device of claim 20 in which:

(a) said passive display device additionally comprises an encapsulant layer disposed on said guidance-defeating means and having a second refractive index, which encapsulant layer and light guidance substrate are disposed one above the other in parallel relationship;

(b) said light guidance substrate has a first refractive index; and (c) said guidance-defeating means further comprises means for selectively applying localized compressive force to said second layer of said light guidance substrate so as to change the refractive index of said second layer such that it approximates the refractive index of said first layer of said light guidance substrate, whereby light is coupled out of said light guidance substrate.

25. An optical display comprising:

(a) a light guidance substrate having parallel first and second surfaces, which light guidance substrate comprises a substantially integral piece of transparent, high-refractive-index dielectric;

(b) a light source comprising red, green and blue lamps disposed within an elliptical reflector which reflector is disposes so as to reflect light emanating from said lamps into said light guidance substrate;

(c) an opaque throat aperture disposed rigidly between said light guidance substrate and said light source, which opaque throat aperture admits light from said light source only at angles such that the sine of any given angle is less than the height of said opaque throat aperture divided by the depth of said opaque throat aperture; and (d) a plurality of pixels disposed on said first surface of said light guidance substrate.

26. The optical display of claim 25 in which each of said pixels comprises:

(a) an electret layer disposed within said light guidance substrate, parallel to and spaced-away from said first surface of said light guidance substrate; and (b) eight cells disposed on said first surface of said light guidance substrate and having respective areas in the ratio 128:64:32:16:8:4:2:1, each cell of which comprises a pair of interdigitated translucent electrodes.

27. The optical display of claim 25 in which each of said pixels comprises:

(a) an electret layer disposed on said first surface of said light guidance substrate;

(c) a clear elastomer layer disposed on said electret layer;

(c) a rigid, clear cover plate, which cover plate has a first surface, and which cover plate comprises on said first surface a plurality of translucent interdigitated electrodes; and (d) eight cells disposed on said first surface of said cover plate and having respective areas in the ratio 128:64:32:16:8:4:2:1, each cell of which comprises a pair of said interdigitated translucent electrodes.

28. The optical display of claim 25 in which:

(a) said optical display bas an optical clock rate significantly faster than the temporal color resolution limit of the human eye;

(b) said light source is adapted to output continually alternating bursts of red, green, and blue light wherein each burst is of duration equal to a multiple of said clock rate; and (c) each of said pixels comprises:

(1) an electret layer disposed on said first surface of said light guidance substrate;

(2) a clear elastomer layer disposed on said electret layer;

(3) a rigid, clear cover plate, which cover plate has a surface, and which cover plate comprises on said surface of said cover plate a plurality of translucent interdigitated electrodes; and (4) means for enabling the pixel for a varying fractional proportion of the burst time of said light source.

29. The optical display of claim 25 in which each of said pixels comprises a pair of interdigitated translucent electrodes disposed on said first surface of said light guidance substrate.

30. The optical display of claim 25 in which each of said pixels comprises:
(a) a translucent indium-tin oxide ground plane disposed on said first surface of said light guidance substrate;
(b) a translucent elastomer layer disposed on said ground plane; and
(c) a translucent indium-tin oxide electrode disposed on said elastomer layer.

31. The optical display of claim 25 in which each of said pixels comprises:
(a) a translucent indium-tin oxide ground plane disposed on said first surface of said light guidance substrate;
(b) a translucent elastomer layer disposed on said ground plane;
(c) a translucent indium-tin oxide electrode disposed on said elastomer layer; and
(d) a translucent dielectric disk which dielectric disk has a refractive index approximately that of said light guidance substrate.

32. A method for visually displaying data, which method comprises:
(a) channeling light in a light guidance substrate; and
(b) selectively defeating conditions for total internal reflection of said channeled light within said light guidance substrate by bringing a refractive-index-matched translucent element into the evanescent field emanating from said light guidance substrate due to the presence of channeled light therein, whereby said channeled light is allowed to escape to the environment of said light guidance substrate.

33. The method of claim 32 in which said step of channeling light in a light guidance substrate further comprises:
(a) providing a light source capable of emitting sequentially the three additive primaries; and
(b) reflecting substantially all of the light emitted by said light source into said light guidance substrate.

34. The method of claim 32 in which said step of channeling light in a light guidance substrate further comprises:
(a) providing a light source capable of emitting light of a given color; and
(b) reflecting substantially all of the light emitted by said light source into said light guidance substrate.

35. A method for visually displaying data, which method comprises:
(a) channeling light in a light guidance substrate, which step of channeling light in a light guidance substrate further comprises:
(1) providing a light source capable of emitting infrared light; and
(2) reflecting substantially all of the light emitted by said light source into said light guidance substrate; and
(b) selectively defeating conditions for total internal reflection of said channeled light within said light guidance substrate whereby said channeled light is allowed to escape to the environment of said light guidance substrate.

36. The method of claim 32 in which said step of selectively defeating conditions for total internal reflection within said light guidance substrate further comprises:
(a) interdigitating a pair of positive and negative conductors on the surface of a light guidance substrate; and
(b) applying current to said positive and negative conductors, whereby a rippling of said surface of said light guidance substrate allows light to escape from said light guidance substrate.

37. The method of claim 32 in which said light guidance substrate comprises a planar exterior surface and in which said step of selectively defeating conditions for total internal reflection further comprises:
(a) disposing an interdigitated pair of electrodes on said planar exterior surface of said light guidance substrate;
(b) forming an electret layer in parallel, spaced-apart relationship with said planar exterior surface of said light guidance substrate, said electret layer being formed within said light guidance substrate; and
(c) selectively charging said pair of electrodes with respective opposite charges.

38. The method of claim 32 in which said step of selectively defeating conditions for total internal reflection further comprises:
(a) disposing an interdigitated pair of electrodes on the exterior surface of a light guidance substrate;
(b) providing such spacing between the members of said pair of electrodes that a diffraction effect may be created upon charging of said electrodes; and
(c) selectively charging said pair of electrodes with respective opposite charges.

39. A method for visually displaying data, which method comprises:
(a) channeling light in a light guidance substrate; and
(b) selectively defeating conditions for total internal reflection of said channeled light within said light guidance substrate whereby said channeled light is allowed to escape to the environment of said light guidance substrate, which step further comprises:
(1) disposing a first electrode on the exterior surface of the light guidance substrate;
(2) encapsulating said electrode with a planar layer of room temperature vulcanizing silicone;
(3) disposing a second, translucent electrode on the exterior surface of said planar layer of room temperature vulcanizing silicone; and
(4) selectively charging said pair of electrodes with respective opposite charges.

40. A method for visually displaying data, which method comprises:
(a) channeling light in a light guidance substrate; and
(b) selectively defeating conditions for total internal reflection of said channeled light within said light guidance substrate whereby said channeled light is allowed to escape to the environment of said light guidance substrate, which step further comprises:
(1) disposing a first electrode on the exterior surface of the light guidance substrate;
(2) encapsulating said planar electrode with a planar layer of room temperature vulcanizing silicone;

(3) disposing a second, translucent electrode on the exterior surface of said planar layer of room temperature vulcanizing silicone;

(4) disposing a disk on said second electrode, which disk has refractive index approximately equal to that of said light guidance substrate; and (5) selectively charging said first and second electrodes.

41. An optical shutter comprising:

(a) a light guidance substrate adapted to channel light, which light guidance substrate is comprised of a high-refractive-index substance;

(b) a deformable dielectric layer; and (c) guidance-defeating means disposed on said deformable dielectric layer, which guidance-defeating means comprises a pair of parallel, translucent electrodes disposed on opposite surfaces of said deformable dielectric layer and means for selectively charging and discharging at least one of said electrodes, and which guidance-defeating means is adapted selectively to violate the light-guidance conditions for said light guidance substrate thus coupling any channeled light out of said light guidance substrate.

42. The optical shutter of claim 41 in which said guidance-defeating means further comprises a translucent disk formed of a high-refractive-index elastomer having a refractive index approximately equal to that of said light guidance substrate, which disk is disposed on one of said electrodes.

43. The optical shutter of claim 41 in which said guidance-defeating means is responsive to electrical control signals.

44. An optical shutter comprising:

(a) a light guidance substrate;

(b) a light-transmitting element having a refractive index approximately equal to that of said light guidance substrate, and which light-transmitting element is maintained in spaced-apart relationship from said light guidance substrate at a distance greater than the wavelength of any channeled light within said light guidance substrate; and (c) means for selectively moving at least a portion of said light-transmitting element within a distance from said light guidance substrate less than one wavelength of any channeled light within said guidance substrate.

45. An optical display comprising:

(a) a light source;

(b) a light guidance substrate adapted to channel light emanating from said light source, and which light guidance substrate manifests an outward-extending evanescent field due to channeled light;

(c) a light-transmitting element having a refractive index approximately equal to that of said light guidance substrate, and which light-transmitting element is adapted selectively to move between two states:

(1) a first state in which said light-transmitting element is maintained in spaced-apart relationship from said light guidance substrate at a distance beyond the evanescent field emanating from said light guidance substrate; and (2) a second state in which at least a portion of said light-transmitting element is maintained in spaced-apart relationship from said light guidance substrate at a distance within the evanescent field emanating from said light guidance substrate; and (d) means for selectively moving said light-transmitting element between said first and second states, thus coupling any channeled light out of said light guidance substrate.

46. An optical display comprising:

(a) a light source;

(b) a light guidance substrate adapted to channel light from said light source;

(c) a transparent ground plane disposed on said light guidance substrate;

(d) a deformable dielectric layer disposed on said ground plane, which deformable dielectric layer has a thickness in the quiescent state greater than one wavelength of the channeled light;

(e) a transparent electrode disposed on said deformable dielectric layer;

(f) a transparent disk disposed on said transparent electrode, which transparent disk is fashioned of material having a refractive index approximately equal to the refractive index of said light guidance substrate; and (g) means to selectively electrostatically charge said transparent electrode with respect to said ground plane, thus compressing said deformable dielectric layer and thereby pulling said transparent disk within the evanescent field emanating from said light guidance substrate.

* * * * *